(12) United States Patent
Seenappa et al.

(10) Patent No.: US 10,880,173 B2
(45) Date of Patent: Dec. 29, 2020

(54) AUTOMATED CERTIFICATION OF NETWORK FUNCTIONS

(71) Applicant: AT&T Intellectual Property I, L.P., Atlanta, GA (US)

(72) Inventors: Vikram Seenappa, Sammamish, WA (US); Joseph Dahan, Redmond, WA (US); Srikanth Tirumala, Redmond, WA (US); Michal Cwian, Kirkland, WA (US); Dana Coburn, Snoqualmie, WA (US); Henry Deccio, Bellevue, WA (US); Henry Romero, Bothell, WA (US); Pratik Gandhi, Monroe, WA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 74 days.

(21) Appl. No.: 16/207,346

(22) Filed: Dec. 3, 2018

(65) Prior Publication Data

US 2020/0177457 A1 Jun. 4, 2020

(51) Int. Cl.
*H04L 12/24* (2006.01)
*H04L 12/26* (2006.01)
(Continued)

(52) U.S. Cl.
CPC .......... *H04L 41/0873* (2013.01); *H04L 43/50* (2013.01); *H04W 16/02* (2013.01); *G06F 9/45533* (2013.01)

(58) Field of Classification Search
CPC ... H04L 1/00; H04L 1/24; H04L 41/00; H04L 41/08–0806; H04L 41/0813;
(Continued)

(56) References Cited

U.S. PATENT DOCUMENTS 6,016,334 A 1/2000 Kasrai
9,007,922 B1 4/2015 Mittal et al.
(Continued)

FOREIGN PATENT DOCUMENTS

EP 1890507 B1 1/2012
WO 2017083024 A1 5/2017
(Continued)

OTHER PUBLICATIONS

Jiang, et al., "Autonomic Network Management for Software-Defined and Virtualized 5G Systems," European Wireless 2017, 6 pages.
(Continued)

*Primary Examiner* — Boris D Grijalva Lobos
(74) *Attorney, Agent, or Firm* — Amin, Turocy & Watson, LLP

(57) ABSTRACT

The described technology is generally directed towards automated acceptance testing of network functions so that only certified network functions are deployed in a wireless network. When a network function attempts to register in a network, e.g., with a network function repository, the registration attempt triggers a workflow that obtains a result of automated testing of the network function. The automated testing operation can be based on a test suite selected according to the network function type and the network slice in which the network function is to be deployed. Only upon determining that the network function passed the automated testing operation is the network function registered (by the network function repository) for operation in the wireless network.

20 Claims, 11 Drawing Sheets

(51) Int. Cl.
*H04W 16/02* (2009.01)
*G06F 9/455* (2018.01)

(58) Field of Classification Search
CPC ..... H04L 41/0866; H04L 43/00; H04L 43/50; H04L 41/0873; H04L 41/0886; H04W 4/00; H04W 4/50; H04W 16/00
See application file for complete search history.

(56) References Cited

U.S. PATENT DOCUMENTS

| | | | |
|---|---|---|---|
| 9,300,562 B2 | 3/2016 | Dufour et al. | |
| 9,438,478 B1 | 9/2016 | Amulothu et al. | |
| 9,703,660 B2 | 7/2017 | Cillis et al. | |
| 9,755,934 B1 | 9/2017 | Shaham et al. | |
| 9,935,818 B1 | 4/2018 | Kim et al. | |
| 10,027,569 B1 | 7/2018 | Ur et al. | |
| 10,063,453 B1 | 8/2018 | Ur et al. | |
| 10,069,694 B1 | 9/2018 | Schwartz et al. | |
| 10,079,745 B2 | 9/2018 | Amulothu et al. | |
| 2012/0253728 A1 | 10/2012 | Chamas et al. | |
| 2014/0337674 A1 | 11/2014 | Ivancic et al. | |
| 2015/0234725 A1* | 8/2015 | Cillis | G06F 11/263 714/33 |
| 2016/0174055 A1* | 6/2016 | Wang | H04L 12/1435 370/259 |
| 2017/0085459 A1* | 3/2017 | Xia | H04L 43/0876 |
| 2017/0141974 A1* | 5/2017 | Lahiri | H04L 43/028 |
| 2017/0155569 A1 | 6/2017 | Chinnaswamy et al. | |
| 2017/0245163 A1 | 8/2017 | Tagg et al. | |
| 2017/0272523 A1* | 9/2017 | Cillis | H04L 41/082 |
| 2017/0317914 A1 | 11/2017 | Yoon et al. | |
| 2017/0318043 A1* | 11/2017 | Shin | H04N 21/44222 |
| 2018/0069749 A1 | 3/2018 | Singhal et al. | |
| 2018/0121335 A1 | 5/2018 | Cillis et al. | |
| 2018/0316543 A1* | 11/2018 | Hwang | G06F 9/45558 |
| 2018/0316591 A1* | 11/2018 | Ashwood-Smith | H04L 43/062 |
| 2019/0104047 A1* | 4/2019 | Tejaprakash | H04L 41/22 |
| 2019/0196837 A1* | 6/2019 | Gagnon | G06F 9/45512 |

FOREIGN PATENT DOCUMENTS

| | | |
|---|---|---|
| WO | 2017097992 A1 | 6/2017 |
| WO | 2018111937 A1 | 6/2018 |
| WO | 2018128875 A1 | 7/2018 |

OTHER PUBLICATIONS

Lopez, et al., "Extended Abstract: Quality Probe for Testing Multimedia Content in 5G Networks," Last Accessed: Jan. 10, 2019, 4 pages.

Sgambelluri, et al., "Orchestration of Network Services Across Multiple Operators: The 5G Exchange Prototype," © 2017 IEEE, 5 pages.

Liu, et al., "Review on Cyber-physical Systems," IEEE/CAA Journal of Automatica Sinica, vol. 4, No. 1, Jan. 2017, 14 pages.

Zhu, et al., "ScalaSEM: Scalable Validation of SDN Design With Deployable Code," 1 © 2015 IEEE, 8 pages.

\* cited by examiner

AUTOMATED CERTIFICATION OF NETWORK FUNCTIONS

TECHNICAL FIELD

The subject application is related to wireless communication systems, and, for example, to registering certified network functions for use in a wireless network.

BACKGROUND

In wireless communication systems, particularly in new radio (NR, sometimes referred to as 5G), network deployments/vendors regularly introduce new (including updated) network functions for use in the production network. The current model of deployment has many challenges, resulting in lengthy in terms of time to market, scale of operations and cost savings.

For example, previous wireless networks (e.g., referred to as Domain 1, or D1), were based on dedicated hardware/appliances that provided the needed services. In Domain 2 (or D2), generally corresponding to the 5G architecture and microservices, nodes are deployed as monolithic network functions, e.g., for cloud based deployment. For example, network virtual instances comprise several different component virtual machines/containers, which forms a virtual network function, in which vendor network function code is decomposed/cloud native and runs on separate containers/pods).

For D2, most vendors have ported the same D1 code (e.g., that ran on conventional x86 server computers) to D2 code. This is one of the problems with deployment, because such ported code leads to extensive integration operations and testing operations before a product using the code can be deployed in the production network.

BRIEF DESCRIPTION OF THE DRAWINGS

The technology described herein is illustrated by way of example and not limited in the accompanying figures in which like reference numerals indicate similar elements and in which.

DETAILED DESCRIPTION

Briefly, one or more aspects of the technology described herein are generally directed towards certifying a network function (virtual network function) through automated acceptance testing, before registering the network function for use in a wireless network. A network function attempts to register in a network, e.g., with a network repository. The registration attempt triggers a workflow that includes automated testing of the network function.

The automated testing can be performed against a suite of tests that are appropriate for that network function, e.g., based on the network function type and/or a network slice, if applicable, in which the network function is to operate. If the network function passes the testing against the test suite, the network function is registered for operation in the network/network slice, and thereafter can be used in the network. As part of registration, other network functions are notified of the newly registered network function.

It should be understood that any of the examples and terms used herein are non-limiting. For instance, examples can be based on New Radio (NR, sometimes referred to as 5G) communications between a user equipment and s network device; however virtually any communication system including 4G LTE and future generations of wireless technology may benefit from the technology described herein, and/or their use in different spectrums may likewise benefit. As another example, the technology is not limited to any particular type of user equipment machine type communication devices, but rather any wireless-capable user equipment may benefit from the technology described herein, including smartphones, machine type communication devices, wearables, sensors, tablets, notebooks, modems (cards, dongles/adapters (e.g., USB)) and so on. Thus, any of the examples herein are non-limiting examples, and any of the embodiments, aspects, concepts, structures, functionalities or examples described herein are non-limiting, and the technology may be used in various ways that provide benefits and advantages in wireless radio communications in general.

Figure 1:
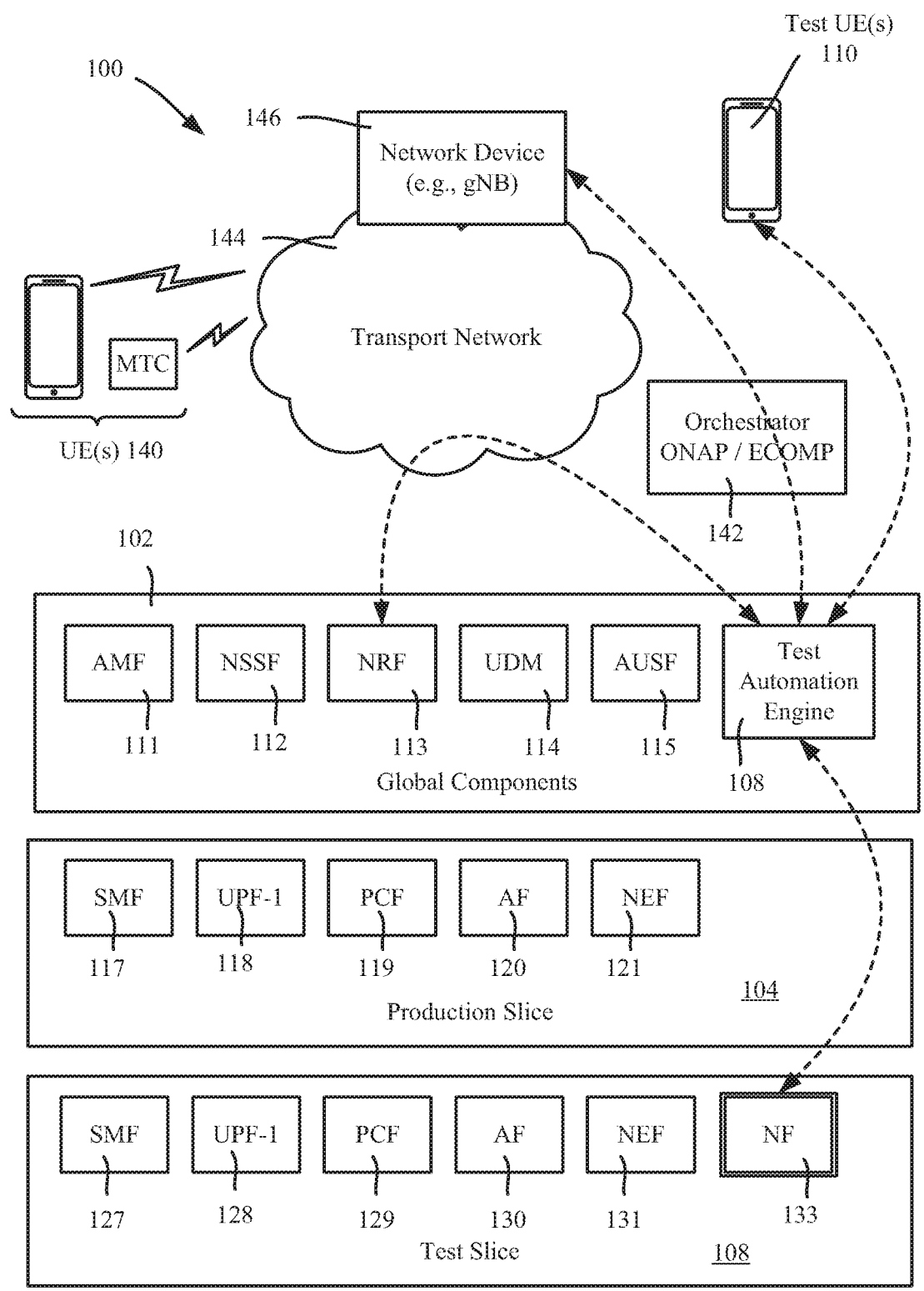
FIG. 1 illustrates an example wireless communication system in which network functions are deployed in a production (e.g., 5G) network slice, and a new network function in a test network slice is tested via test automation, in accordance with various aspects and implementations of the subject disclosure.

FIG. 1 illustrates an example wireless communication system 100 in accordance with various aspects and embodiments of the subject technology, in which various components are arranged for network operation as well as test automation. In one or more embodiments, the system 100 can comprise a global components 102 (which can be considered like a global network slice), a network production slice 104 and a network test slice 106, each of which comprise various network function instances. Note that typically there are many production slices, however only one is shown in FIG. 1 for purposes of simplicity in viewing. In general, network slicing in 5G radio access network (RAN) provides different handling of data depending on the type of data and user subscription. For example, different users can have different service requirements via different network slices, such as based on Service Level Agreements (SLAs) and subscriptions. Moreover, slices are separated from one another; e.g., a problem occurring in one network slice, such as shortage of shared resources, does not impact the service level agreement for another network slice.

Non-limiting examples of 5G RAN network slices can include slices designed for consumer communications, enterprise communications, public safety (e.g., FirstNet®) communications, MTC machine type communications, such as for internet of things (IoT) devices, mobile health communications, and so forth. Further, as described herein, the test slice 106 contains network function instances that are to be tested via a test automation engine 108 before they are accepted for operation in a network slice that handles actual, live traffic. Note that in one or more implementations, as part of testing, test user equipment(s) 110 comprising real user equipment can be used.

In FIG. 1, example network function instances/components of the global components 102 can communicate with each other and with any network function component of a network slice. Example, non-limiting global components/ function instances comprise as an access and mobility management function (AMF) instance 111 and a network slice selection function (NSSF) 112. The AMF instance 111 serves a user equipment session; note that the AMF instance 111 is associated with one or more network slice instances that are serving a user equipment. For example, the AMF retrieves the slices that are allowed by the user subscription and interacts with the network slice selection function (NSSF) 112 to select the appropriate network slice instance (which could result in a changed AMF).

A network repository function 113 acts as a gateway for other network functions. For example, the network repository function 113 provides information of network function instances including their supported services within the network, and can be used for the discovery of network functions using the selected network slice instance. As described herein, the network repository function 113 registers network functions for operation in the network, e.g., in a network slice, and notifies other network functions of a newly registered network function. In one or more implementations described herein, the network repository function 113 works with the test automation engine 108 to perform acceptance testing of any network function that is attempting to register, so as to only register network functions that are certified with respect to having passed an automated testing operation.

Other examples of global components shown in FIG. 1 comprise a unified data management (UDM) network function instance 114 and an authentication server function (AUSF) 115. In general, the UDM instance 114 provides information about user equipments such as status and related network functions, as well as provide authentication data and related information. Authentication functionality (e.g., via the extensible authentication protocol) is provided by the AUSF component 115.

FIG. 1 also network slice network function instances, including those in the production slice 104. Non-limiting example network function instances shown in FIG. 1 comprise a session management function (SMF) instance 117 and a user plane function (UPF, or UPF-1) instance 118. The UPF instance 118 performs operations such as packet routing and forwarding, interconnection to the data network, policy enforcement and data buffering. The SMF 117 is responsible for session management and, for example allocates IP addresses to user equipments 140; the SMF 117 also selects and controls the UPF 118 for data transfer.

Other 5G network slice functions shown in FIG. 1 comprise a policy control function (PCF) 119, which in general provides policy rules for enforcing control plane function(s) by using subscription information obtained from the UDM function 114. Other network slice functions shown in FIG. 1 comprise an application function (AF) 120, which in general deals with traffic routing and interacting with policy framework for policy control, and also accesses a network exposure function (NEF) 121, which provides security when services or application functions (AFs) access 5G core components/nodes.

The test slice 108 shows network function instances 127-131 that are similar to the above-described production slice network function instances; for purposes of brevity, their functionalities are not described again. In general, when a new network function 133 is developed, such as introduced by a vendor, whether an update/replacement or a new function, an instance of the new network function is tested as described herein, before being deployed in a production slice 104. Note that in order to test, copies of working production instances need to be available to the network function 133 under test, and are thus present in the test slice 108.

Further shown in FIG. 1 is an orchestrator 142 along with the transport network 144 and network device 146, e.g., a gNodeB. The orchestrator 142 can be based on the ONAP (open network automation platform) platform for "real-time, policy-driven orchestration and automation of physical and virtual network functions" and ECOMP (Enhanced Control, Orchestration, Management & Policy) technologies.

In general, and as described herein, the orchestrator 142 instantiates "Spins-up" a new network function, such as the new network function 133, which then attempts to register with the NRF 113. This results in automated testing as described herein, to certify (or not) that the network function 133 has passed the acceptance testing needed for deployment in an actual production slice.

Figure 2:
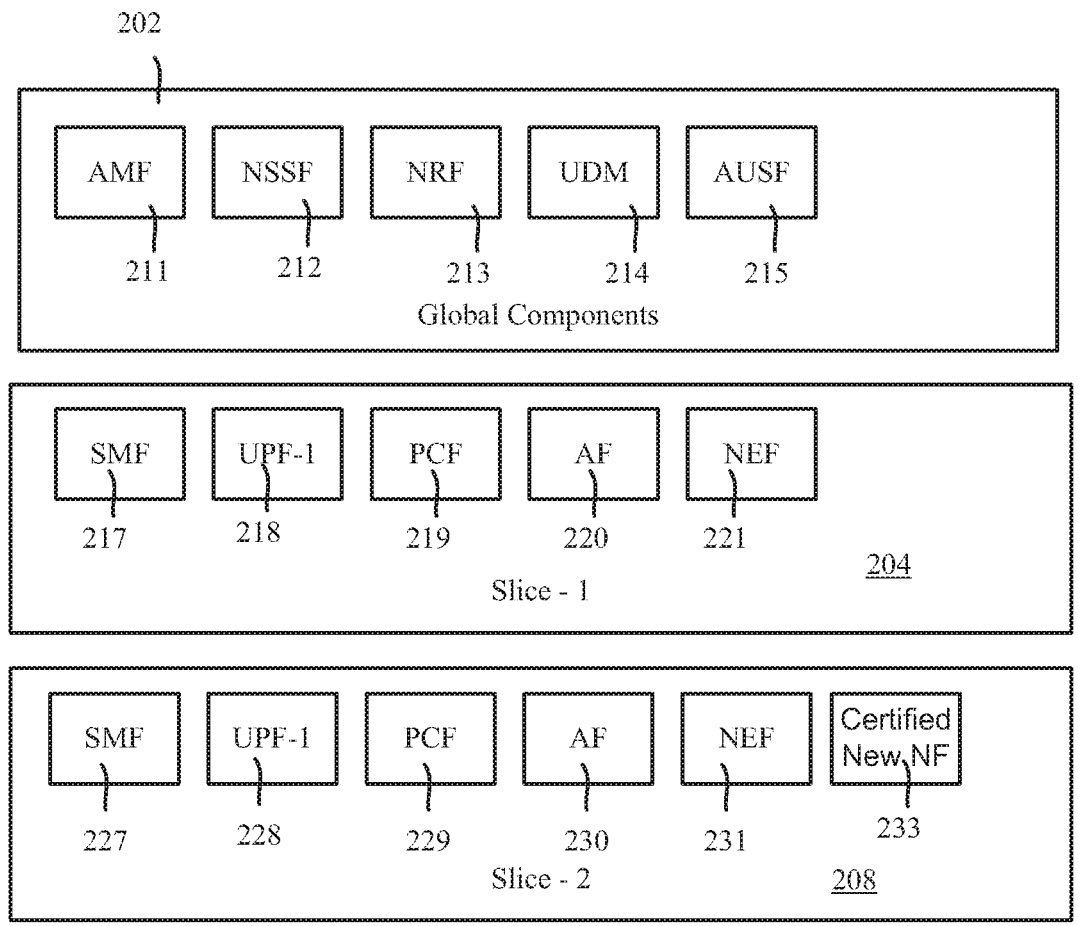
FIG. 2 illustrates an example deployment view of network slices including a network slice that comprises a certified new network function that was successfully tested via test automation, in accordance with various aspects and implementations of the subject disclosure.

As represented in FIG. 2, which shows a 5G Deployment view example, if the new network function 133 passes the automated testing operation, the new network function 133 is deployed as a certified new network function 233 in a production network slice ("Slice-2") 208. Note that, the production network slice ("Slice-1") 204 can be the same network slice 104 as in FIG. 1, or a different network slice, or possibly have some different instances of network functions therein. Similarly the global components 202 can be the same global components 102 as in FIG. 1, or different instances thereof. This is reflected in the labeling, where 2xx in FIG. 2 generally represents the same or similar components to those labeled 1xx in FIG. 1). Note that this also applies to FIG. 3, that is, 3xx instead of 1xx (FIG. 1) or 2xx (FIG. 2)

Figure 3:
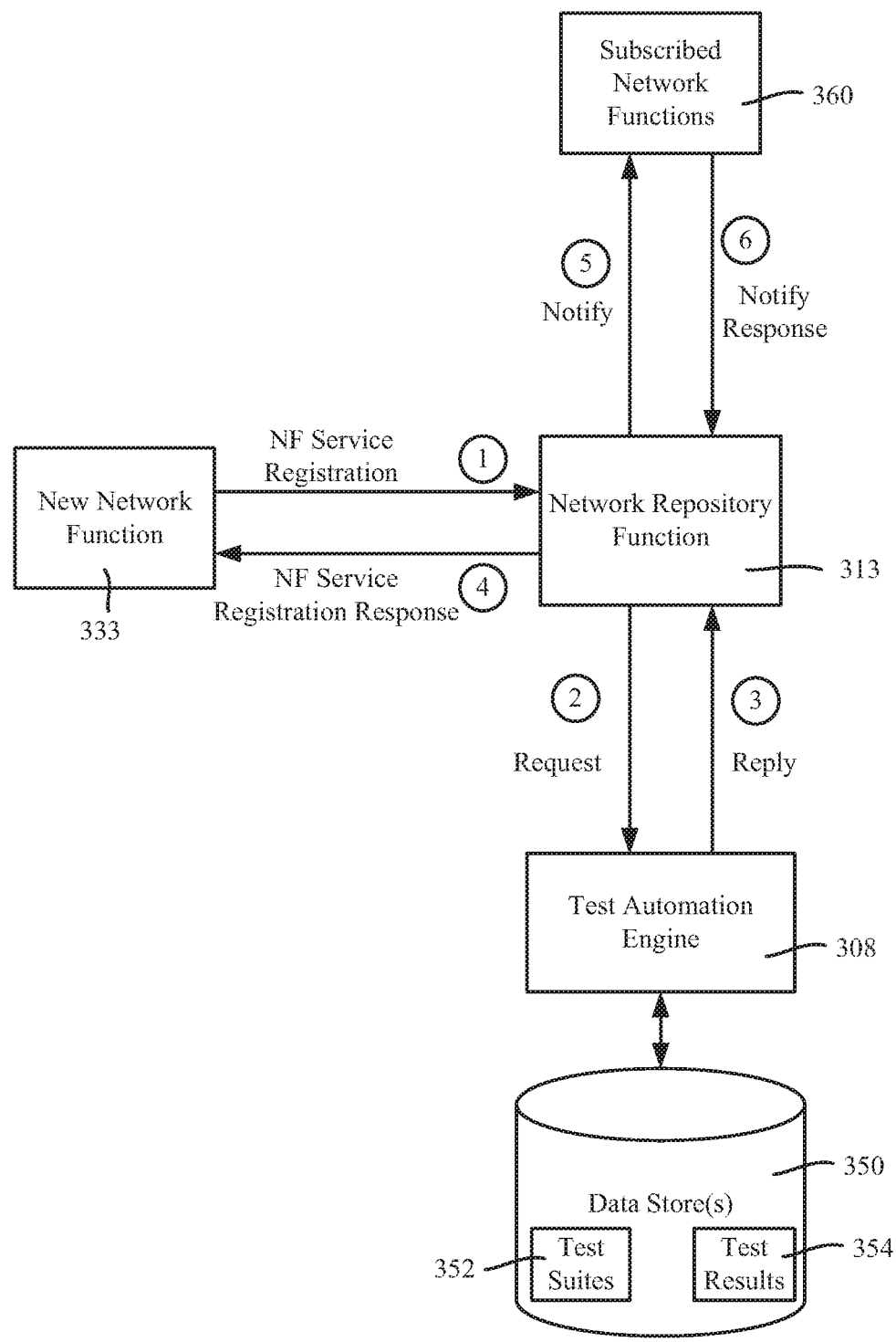
FIG. 3 is an example timing/dataflow diagram illustrating communication of components during registration, including communication between a test automation engine and network repository function, in accordance with various aspects and implementations of the subject disclosure.

FIG. 3 shows a timing data flow diagram representing how automated testing works in one or more implementations. In general, when a new network function 333 attempts to register (arrow one (1)) with the appropriate network repository function 313, the network repository function 313 communicates with the test automation engine 308 requesting performance (or results) of an acceptance test (arrow two (2)). The request generally includes relevant information about the network function, such as its type and the type of network slice (or if global) in which the network function is intended to be deployed. For example, the network repository function 313 and test automation engine 308 can communicate using SBI (Service Based Interface); the network repository function 313 to test automation engine 308 communications can be optional and can be configurable in the network repository function 313.

The test automation engine 308 includes or is coupled to one or more data stores 350, and locates, based on the type information, an appropriate test suite from among various test suites 352 that have been composed by experienced testing personnel or the like. The suite of tests per network function type and/or its network slice type can be predefined in the test automation engine 308 and can be standardized for the network functions of this type/network slice type. The extent of the testing can be configurable in the test automation engine 308 (e.g., cloud, network, security, application level test, and so forth). Some tests can be appropriate for any network function, e.g., tests for susceptibility to known malware/attacks. Other example tests can include scale tests, such as for operation with many operational devices, e.g., for MTC network slice operation, reliability tests, (e.g., for public safety network slice operation), operation with high load/limited resources and so forth.

When the acceptance testing operation against the one or more tests in the test suite is complete or the test automation engine 308 recognizes that the network function has already been tested against the most recent test suite, the test automation replies to the request, (arrow three (3)), e.g., with a success result (network function is certified for production network operation) or a failure result. To this end, the test automation engine data store 350 can store the most recent test results, and the test automation engine 308 can decide, based on the status of the network functions, in the slice if the test needs to be repeated. Thus, if the stored test result is current, the test automation engine 308 has the option to proceed without a new test.

The reports/data/results 354 of the testing operation are thus saved; note that this can be for failure analysis by the vendor/developer, but also if the testing resulted in a success (although successful, to see what can be improved, what came close to failure, and so on). Still further, it is feasible to have a test be successful but result in a warning, which can be analyzed for future updates to a network function.

Based on the reply, the network repository function 313 responds to the network function's service registration request, (arrow four (4)), e.g., with information indicating that the network function is registered for operation, or cannot be registered. If successful, the network repository function 313 also notifies the other subscribed network functions including global network functions/components/services, and if deployed into a network slice, the other functions of that network slice (arrow five (5)). The notified entities respond with a notify response (arrow six (6)), and the certified new network function can be deployed into the network as an operational network function with respect to live traffic.

Figure 4:
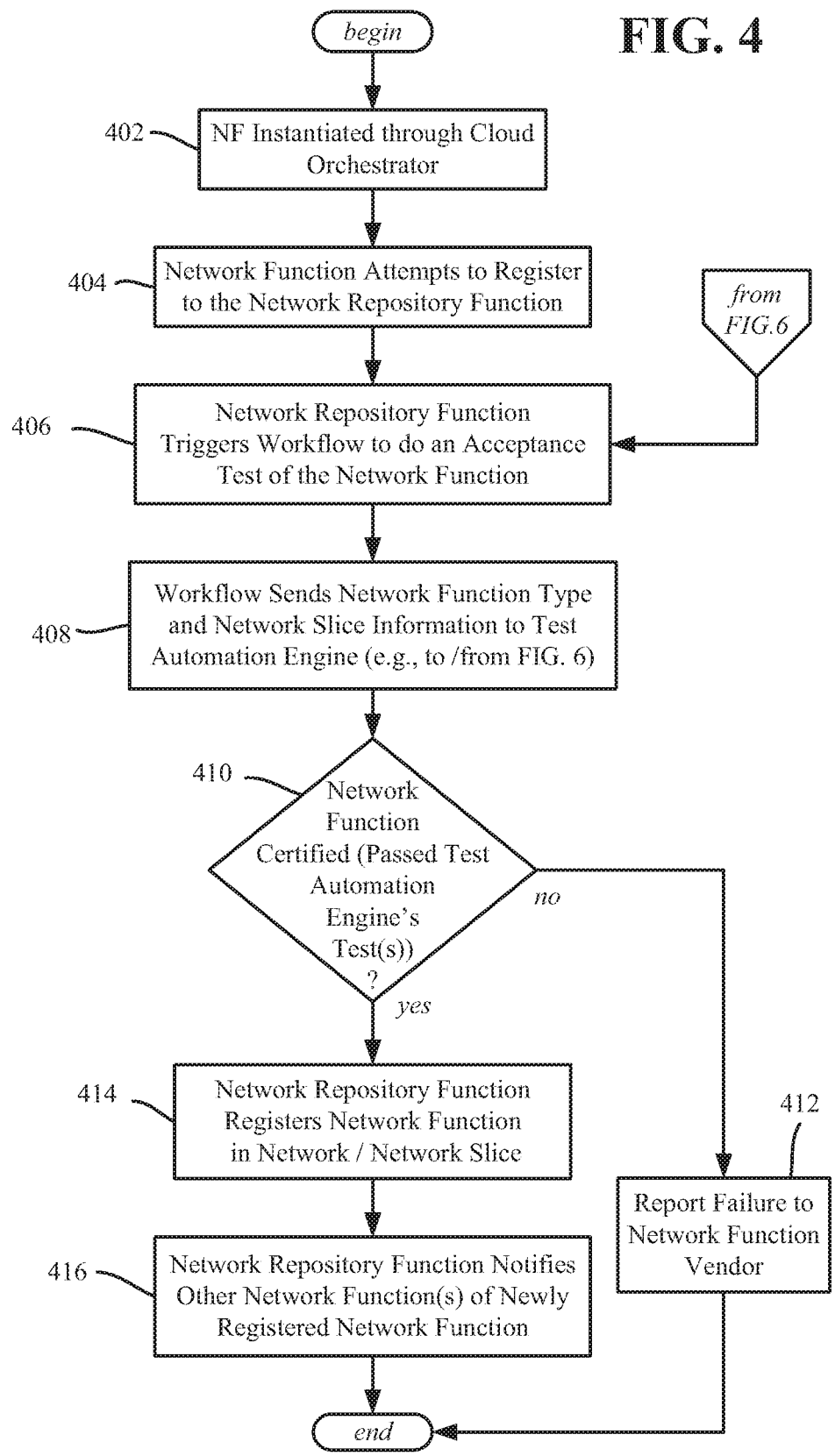
FIG. 4 is a flow diagram of example operations for registering (or not) a network function based on automated testing results, in accordance with various aspects and implementations of the subject disclosure.

Turning to example operations, FIG. 4 shows a flow diagram related to registering a new network function, beginning at operation 402 where the network function is instantiated (gets "spun up") by the orchestrator. In the example of FIG. 4, when instantiated the network function attempts to register with the network repository function (operation 404).

Figure 5:
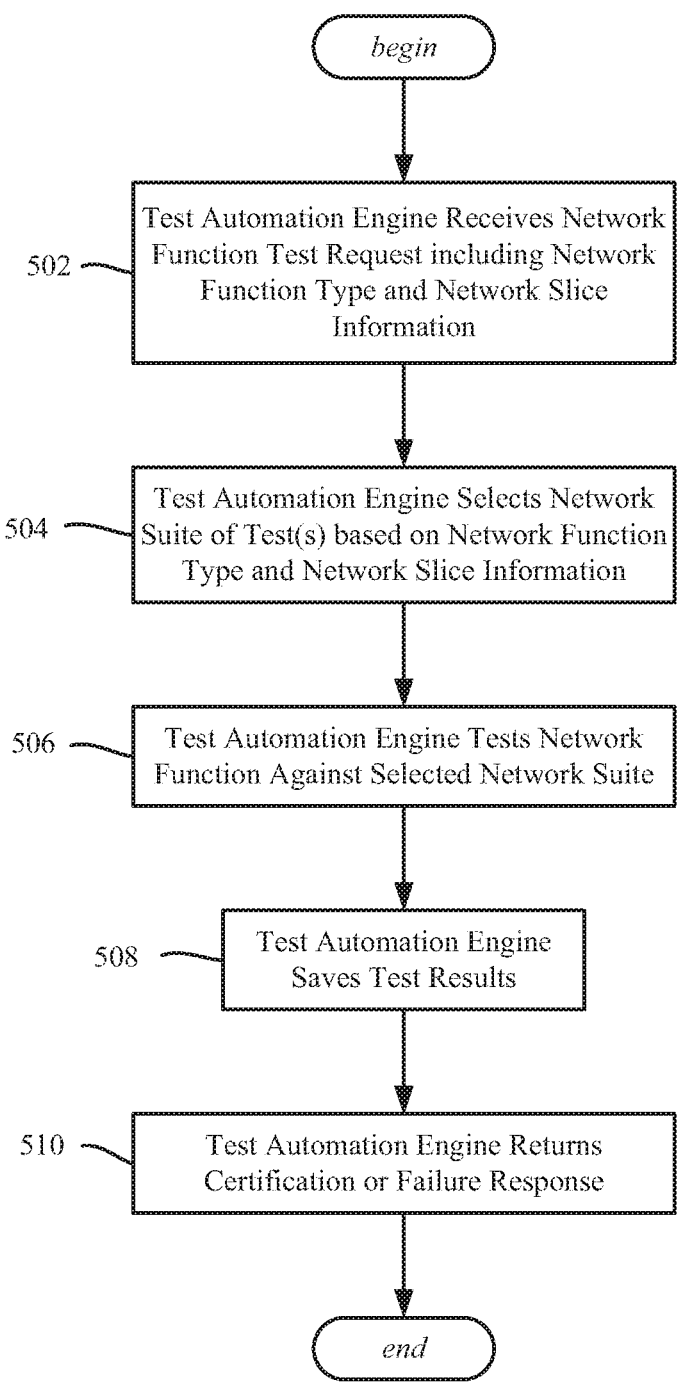
FIG. 5 is a flow diagram of example operations of a test automation engine when a request to certify a network function, based on test suite acceptance testing, is received, in accordance with various aspects and implementations of the subject disclosure.

As represented by operation 406, in response to the registration request, the network repository function triggers a workflow, which is directed towards having an acceptance test performed on the network function. As part of the workflow, as represented by operation 408, information related to the network function is provided to the test automation engine, such as the type of network function, its location, supported services, whether the network function is intended to be or global or part of a network slice, and if part of a network slice, which network slice. FIG. 5 represents general operations of the test automation engine.

Operation 410, which can occur in response to the workflow/test automation engine responding to the network repository function, evaluates whether the network function passed the test automation engine's test suite, that is, the network function is a certified network function. If not, via operation 412 the vendor/provider/supplier of the network function is notified in some suitable way of the failure, typically along with failure information provided thereto, e.g., which test or test(s) failed, other information such as why (worked until scaled up, susceptible to malware X, etc.), and so forth.

If the network function passed the certification tests, as represented by operation 414, the network repository function registers the network function in the network and thereby adds the network function as an operational function in the network with respect to handling live traffic, whether at the global level or at the network slice level, as appropriate. In the example of FIG. 4, as part of registration, at operation 416 the network repository function notifies the other network function(s) of newly registered network function, including those in the same network slice in which the new network function is operational (if registered for operation at the network slice level). Note that another network function can be deregistered, e.g., if the new network function is an update or replacement to what was an existing, and thus now deregistered, former network function.

FIG. 5 shows example operations of a test automation engine, beginning at operation 502 at which the test automation engine receives a network function test request including any accompanying information that is relevant to the network function testing, e.g., network function type and network slice information. Based on the network function type, and network slice (or global network) information, the test automation engine selects a relevant network suite of one or more test(s). This allows, for example, a network function intended for use in an internet of things (IoT) slice, which couples to thousands of low powered devices, for example, to be tested differently from the same general network function being tested to operate in a different type of slice, such as FirstNet® slice which provides a highly reliable, highly secure wireless communications network, and so forth with respect to other types of network functions and slices. Note that some test(s) in a test suite can be the same for any network function and global operation/network slice operation, such as tests directed towards a network function's susceptibility to malware.

In this way, as represented by operation 506, the test automation engine acceptance tests network function against the selected network suite, with the operation results saved at operation 508. At operation 510, the test automation engine returns a certification response or a failure response with respect to the network function for which testing was requested. Note that this is only one example alternative; for example, the test automation engine can simply return a "testing complete" status, with the workflow looking up the results where they are stored, so that the network repository function knows whether to register the network function or not.

It should be understood that the above operations are only examples of one or many possible implementations. For example, in one example alternative implementation, instead of having the network function being spun up by the orchestrator and then attempting to register with the network repository function, the orchestrator can more directly communicate with the test automation engine to test the network function. The orchestrator can know the same information regarding the network function as the network repository function, or can obtain any information from the network repository function as needed, before invoking the test automation engine. The test automation engine can thus similarly perform the testing as generally done in FIG. 5, store the results of the testing operation, and notify the orchestrator. Then, after testing is complete, the orchestrator spins up the network function, which attempts to register with the network repository function. The registration attempt can result in the network repository function accessing the test results, which in turn causes the registration or failure.

It is also feasible for some pre-testing to occur, e.g., manually or via the orchestrator. Thereafter, if the network function passes the pre-testing operation, a regular/more thorough testing operation, such as described above with reference to FIGS. 4 and 5, can be conducted. This, for example, can allow for more efficient overall operation, e.g., eliminate candidate network functions such as based on global tests such as susceptibility to malware or some more difficult-to-pass test(s) before those candidate network functions even attempt to register with the live/operational network repository function.

Figure 6:
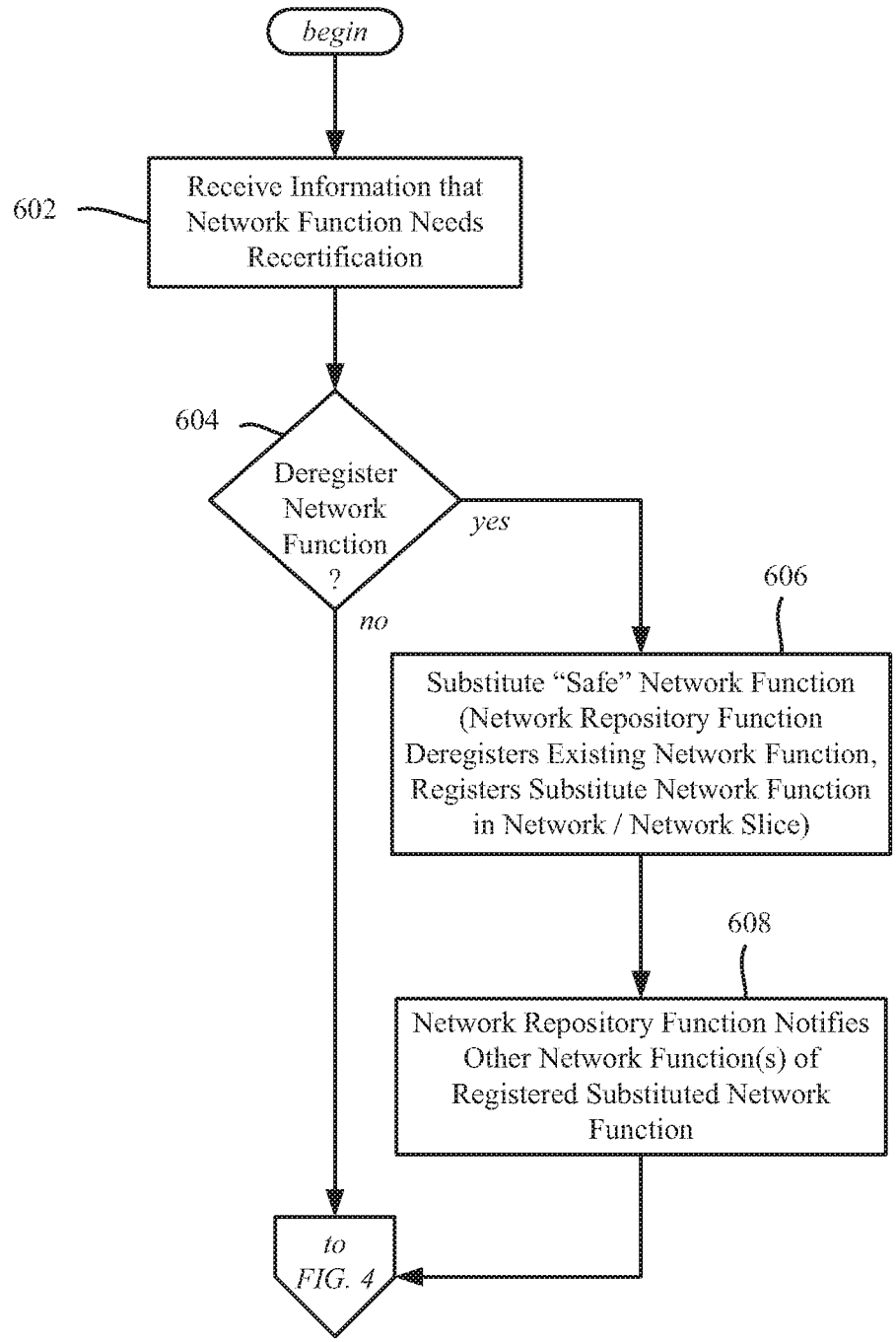
FIG. 6 is a flow diagram of example operations related to recertification of a network function, in accordance with various aspects and implementations of the subject disclosure.

FIG. 6 shows another example aspect with respect to retesting a network function, namely, when recertification is desired, as represented by operation 602. For example, over time, a new type of malware can be detected, a "better" test suite can be developed, and so forth. Operation 604 represents determining whether to deregister the network function. Note, for example, that it may not be possible to take the network function out of the network, in which case the network function has to remain operational; however the network function can be tested against the new test(s) to determine a course of action. Alternatively, it may be possible to substitute a "safe" network function, such as one that is perhaps older, less functional or the like, but is not, for example, susceptible to a malware attack that has caused the recertification need. Thus, operations 604, 606 and 608 (notify other network functions of registered/substituted network function) can replace such a possibly compromised network function, until recertified.

In the example of FIG. 6, the operations return to operation 406 of FIG. 4 to re-test the network function that needs retesting, whether deregistered from operation or not. Note that if not deregistered, testing can occur on a copied instance of the network function so as to not interfere with the network function's live traffic operations.

Figure 7:
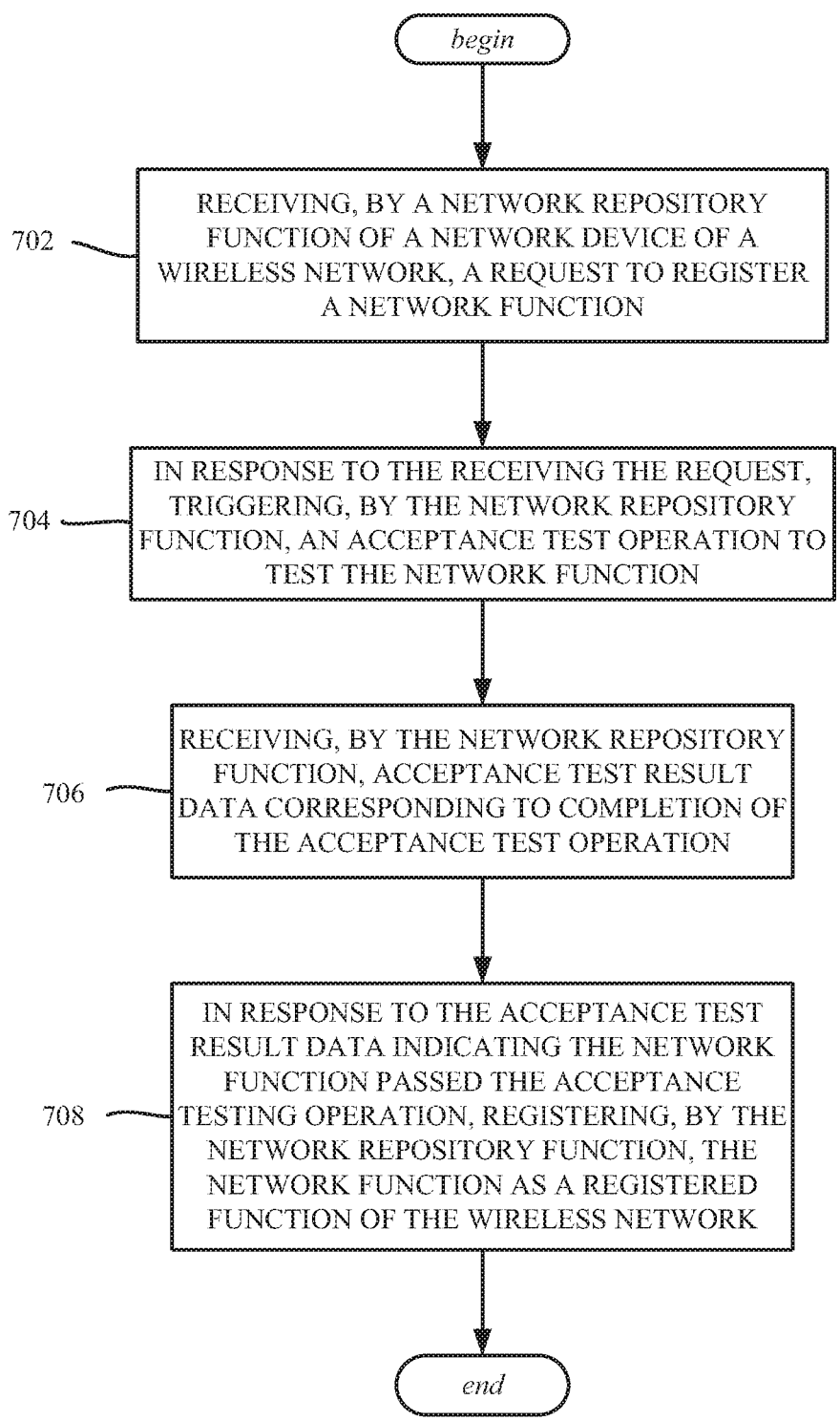
FIG. 7 illustrates a flow diagram directed towards example operations of a network repository function with respect to having a network function tested before registering the network function for operation in a wireless network, in accordance with various aspects and implementations of the subject disclosure.

One or more aspects, generally represented in FIG. 7, represent example operations, comprising receiving (operation 702), by a network repository function of a network device of a wireless network, a request to register a network function. Operation 704 represents, in response to the receiving the request, triggering, by the network repository function, an acceptance test operation to test the network function. Operation 706 represents receiving, by the network repository function, acceptance test result data corresponding to completion of the acceptance test operation. Operation 708 represents, in response to the acceptance test result data indicating the network function passed the acceptance testing operation, registering, by the network repository function, the network function as a registered function of the wireless network.

The registering operation can comprise adding the network function to a registered function data structure used by network devices of the wireless network. The acceptance test operation can be a first acceptance test operation, and further aspects can comprise, after adding the network function to the wireless network, receiving, by the network repository function, information indicating that the first acceptance test operation has changed to a second acceptance test operation, in response to the receiving the information, deregistering the network function from the wireless network, and triggering the second acceptance test operation to retest the network function, receiving second acceptance test result data corresponding to completion of the second acceptance test operation, and in response to the second acceptance test result data indicating the network function passed the second acceptance testing operation, reregistering, by the network repository function, the network function.

The acceptance test result data can indicate that the network function passed the acceptance testing operation, and registering the network function can comprise adding the network function to a fifth generation (5G) network slice of the wireless network.

Triggering the acceptance test operation comprises identifying a type of the network function to a network test automation engine. The acceptance test operation can comprise a test suite, and triggering the acceptance test operation can comprise sending information to a network test automation engine corresponding to the test suite.

The network function can be a first network function; further aspects can comprise, notifying, by the network repository function, a second network function registered with the network repository function in response to the registering the first network function.

Further aspects can comprise, in response to the acceptance test result data indicating the network function has not passed the acceptance testing operation, outputting, by the network repository function, failure data correspond to the acceptance testing operation of the network function.

Figure 8:
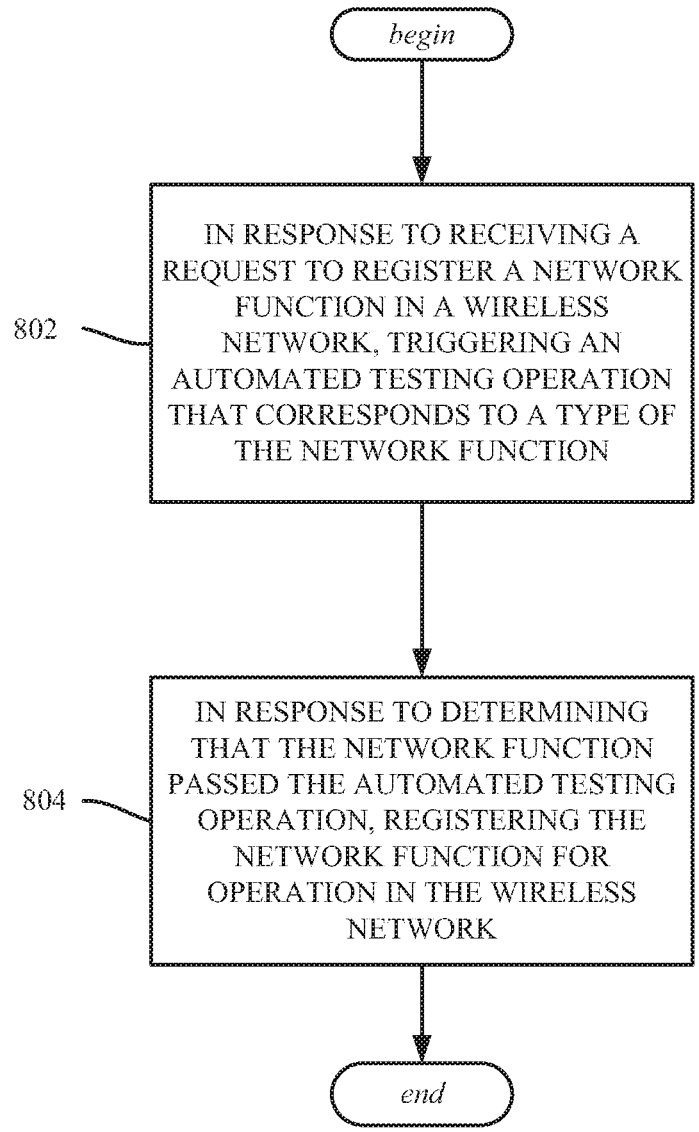
FIG. 8 illustrates a flow diagram directed towards example operations for having a network function tested before registering the network function for operation in a wireless network, in accordance with various aspects and implementations of the subject disclosure.

FIG. 8 represents an example system, e.g., comprising a processor and a memory that stores executable instructions that, when executed by the processor, facilitate performance of example operations. Operation 802 represents in response to receiving a request to register a network function in a wireless network, triggering an automated testing operation that corresponds to a type of the network function. Operation 804 represents in response to determining that the network function passed the automated testing operation, registering the network function for operation in the wireless network.

Triggering the automated testing operation can comprise triggering a workflow that starts a network test automation engine. Registering the network function in the wireless network can comprise receiving a result of the automated testing operation from the network test automation engine at an orchestrator component or a network repository function component of the wireless network.

Registering can comprise adding the network function to a network slice of the wireless network. Further operations can comprise providing network slice type information to the network test automation engine for selection of a network slice type-based test suite corresponding to the automated testing operation.

The network function can be a first network function, and further operations can comprise, notifying a second network function previously registered in the wireless network in response to the registering the first network function. The acceptance test operation can be a first acceptance test operation, and further operations can comprise, after the registering the network function in the wireless network, receiving information indicating that the first automated testing operation has changed to a second automated testing operation, and in response to the receiving the information, triggering the second automated testing operation, and reregistering the network function in the wireless network in response to determining that the network function passed the second automated testing operation.

Figure 9:
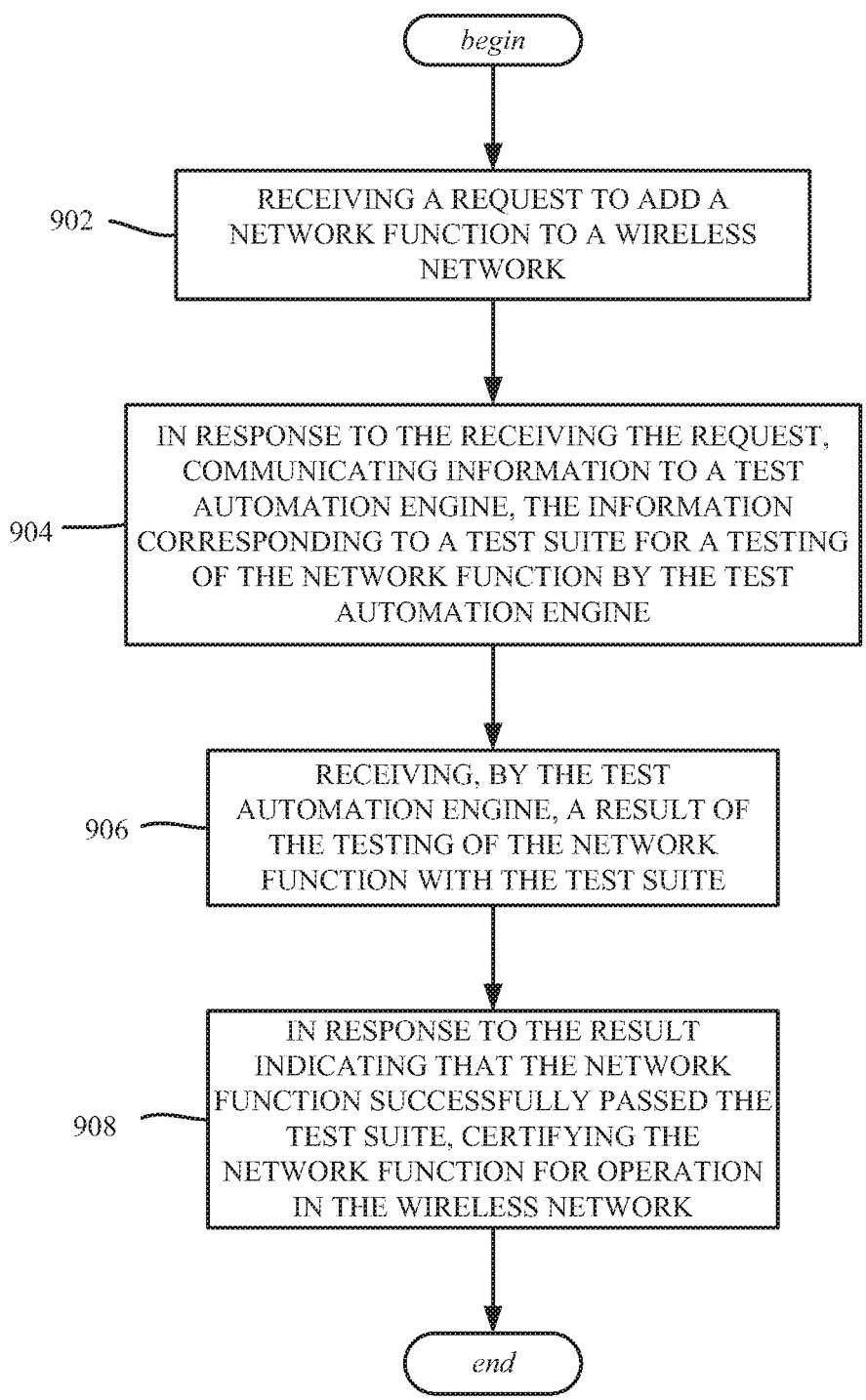
FIG. 9 illustrates a flow diagram directed towards example operations for having a network function tested with an appropriate test suite of before registering the network function for operation in a wireless network, in accordance with various aspects and implementations of the subject disclosure.

One or more aspects are represented in FIG. 9 as example operations, such as corresponding to a machine-readable storage medium, comprising executable instructions that, when executed by a processor, facilitate performance of the operations. Operation 902 represents receiving a request to add a network function to a wireless network. Operation 904 represents, in response to the receiving the request, communicating information to a test automation engine, the information corresponding to a test suite for a testing of the network function by the test automation engine. Operation 906 represents receiving, by the test automation engine, a result of the testing of the network function with the test suite. Operation 908 represents, in response to the result indicating that the network function successfully passed the test suite, certifying the network function for operation in the wireless network.

Certifying the network function for operation in the wireless network can comprise registering the network function with a network repository function. Certifying the network function for operation in the wireless network can comprise adding the network function to a network slice of the wireless network. The network function can be a first network function, and further operations can comprise, notifying a second network function operating in the network slice based on the result indicating that the first network function successfully passed the test suite.

The test suite can be a first test suite, the result can be a first result that indicates that the network function successfully passed the first test suite, and further operations can comprise receiving, after certifying the network function for operation in the wireless network, change information indicating that the first test suite has changed to a second test suite, and in response to the receiving the change information, removing the network function from operation in the wireless network. Still further operations can comprise communicating retest information to the test automation engine, the retest information corresponding to the second test suite for a retesting of the network function by the test automation engine, receiving a second result of the retesting of the network function by the test automation engine, and recertifying the network function for operation in the wireless network based on the second result indicating that the network function successfully passed the second test suite.

As can be seen, a network function is tested in an automated way before being certified as deployable into a network. The testing is based on the network function type and/or network slice type. The technology thus facilitates the faster deployment of network functions and their services faster in a continuous integration continuous deployment (CI/CD) model. The technology also provides cost savings, such as in terms of fewer resources needed to introduce a network function in a production network, generally via a "plug-and-play" mode of operation.

Figure 10:
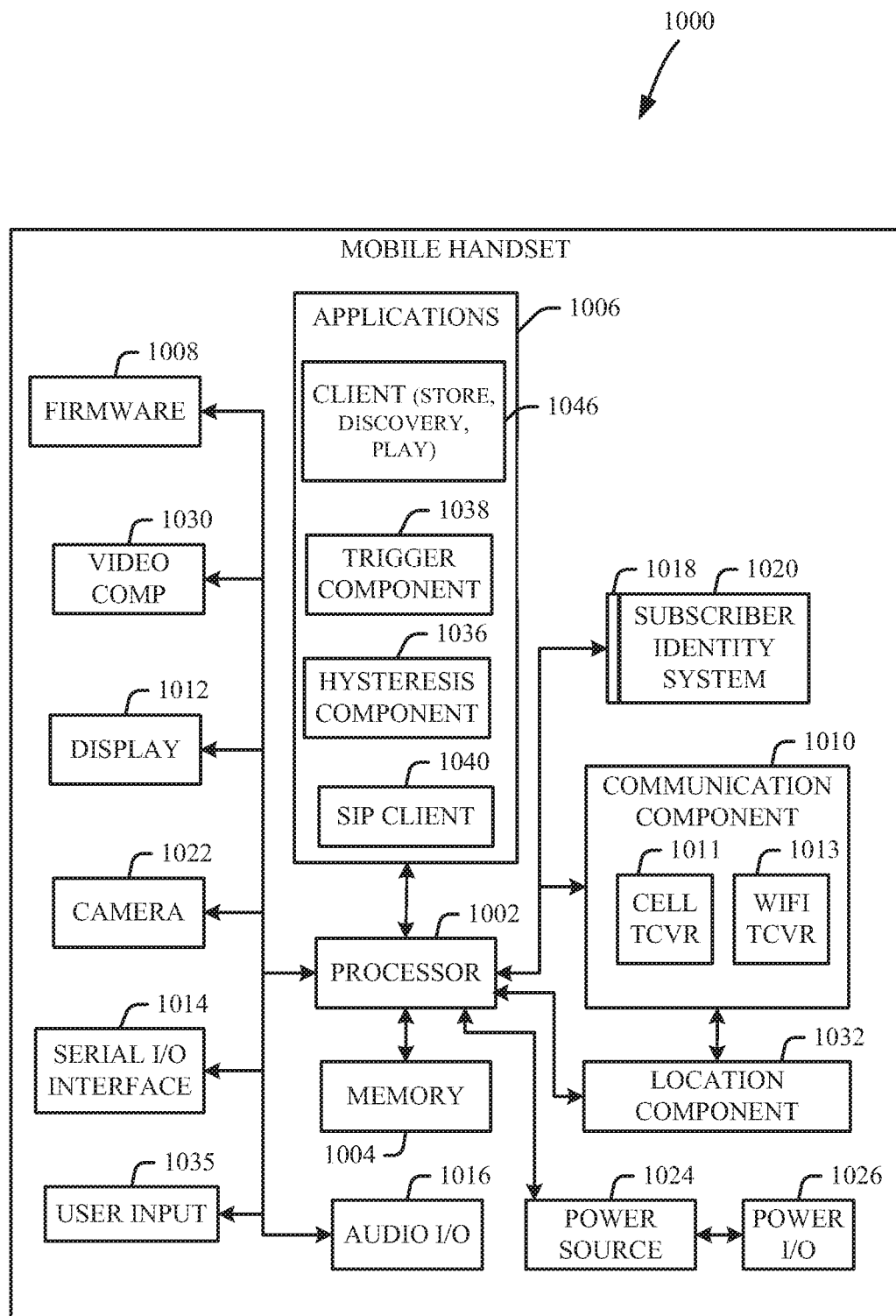
FIG. 10 illustrates an example block diagram of an example mobile handset operable to engage in a system architecture that facilitates wireless communications according to one or more embodiments described herein.

Referring now to FIG. 10, illustrated is an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1094) through a hard-wire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card Subscriber Identity Module (SIM) or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VoIP traffic can be utilized by the handset 1000 and IP-based multimedia content can be received in either an encoded or a decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Figure 11:
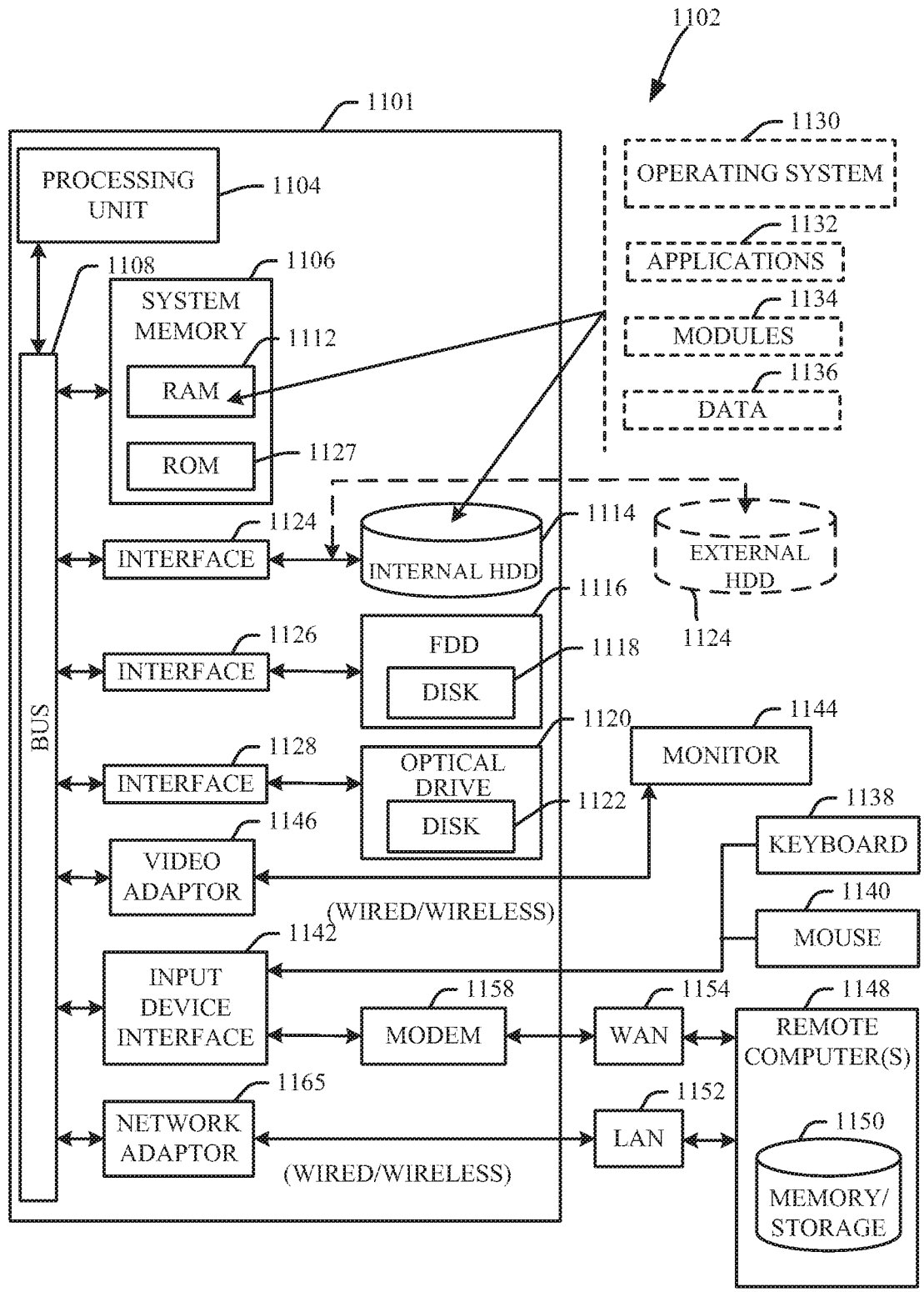
FIG. 11 illustrates an example block diagram of an example computer operable to engage in a system architecture that facilitates wireless communications according to one or more embodiments described herein.

Referring now to FIG. 11, illustrated is an example block diagram of an example computer 1100 operable to engage in a system architecture that facilitates wireless communications according to one or more embodiments described herein. The computer 1100 can provide networking and communication capabilities between a wired or wireless communication network and a server (e.g., Microsoft server) and/or communication device. In order to provide additional context for various aspects thereof, FIG. 11 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 11 is but one example of a computing device.

In order to provide a context for the various aspects of the disclosed subject matter, FIG. 11 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, part of the hardware of system 1120, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1116 can include volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. As an example, a mobile device and/or portable device can include a user interface embodied in a touch sensitive display panel allowing a user to interact with computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 and a move use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:
1. A method, comprising:
  receiving, by a network repository function enabled by network equipment, a request to register a network function;
  in response to the receiving the request, triggering, by the network repository function, a first acceptance test operation to test the network function;
  receiving, by the network repository function, first acceptance test result data corresponding to the first acceptance test operation;
  in response to the first acceptance test result data indicating the network function passed the first acceptance testing operation, registering, by the network repository function, the network function as a registered function of a network; and
  in response to receiving information indicating that the first acceptance test operation has changed to a second acceptance test operation:
  deregistering, by the network repository function, the network function from the network, triggering, by the network repository function, the second acceptance test operation to retest the network function, and in response to receiving second acceptance test result data indicating the network function passed the second acceptance testing operation, reregistering, by the network repository function, the network function.

2. The method of claim 1, wherein the registering comprises adding the network function to a registered function data structure used by the network equipment.

3. The method of claim 1, wherein the first acceptance test result data indicates the network function passed the first acceptance testing operation, and wherein registering the network function comprises adding the network function to a fifth generation network slice via the network.

4. The method of claim 1, wherein triggering the first acceptance test operation comprises identifying a type of the network function to a network test automation engine.

5. The method of claim 1, wherein the first acceptance test operation comprises a test suite, and wherein triggering the first acceptance test operation further comprises sending information to a network test automation engine corresponding to the test suite.

6. The method of claim 1, wherein the network function is a first network function, and further comprising, notifying, by the network repository function, a second network function registered with the network repository function in response to registering the first network function.

7. The method of claim 1, further comprising, in response to the first acceptance test result data indicating the network function has not passed the first acceptance testing operation, outputting, by the network repository function, failure data correspond to the first acceptance testing operation of the network function.

8. The method of claim 1, further comprising, selecting, by the network repository function, a network slice type-based test operation for the first acceptance testing operation based on network slice type information.

9. A system, comprising:
a processor; and
a memory that stores executable instructions that, when executed by the processor, facilitate performance of operations, the operations comprising:
in response to receiving a request to register a network function via a network, triggering a first automated testing operation that corresponds to a type of the network function;
in response to determining that the network function passed the first automated testing operation, registering the network function for operation via the network; and
in response to receiving information indicating that the first automated testing operation has changed to a second automated testing operation:
triggering the second automated testing operation, and
reregistering the network function in the network in response to determining that the network function passed the second automated testing operation.

10. The system of claim 9, wherein triggering the first automated testing operation comprises triggering a workflow that starts a network test automation engine.

11. The system of claim 9, wherein registering the network function in the wireless network comprises receiving a result of the first automated testing operation from a network test automation engine at an orchestrator component or a network repository function component via the of the network.

12. The system of claim 9, wherein the registering comprises adding the network function to a network slice of the network.

13. The system of claim 12, wherein the operations further comprise, providing network slice type information to a network test automation engine for selection of a network slice type-based test suite corresponding to the first automated testing operation.

14. The system of claim 9, wherein the network function is a first network function, and wherein the operations further comprise, notifying a second network function previously registered in the wireless network in response to registering the first network function.

15. A non-transitory machine-readable medium, comprising executable instructions that, when executed by a processor, facilitate performance of operations, the operations comprising:
receiving a request to add a network function to a network;
in response to receiving the request, communicating information to a test automation engine, the information corresponding to a first test suite for a testing of the network function by the test automation engine;
receiving, by the test automation engine, a result of the testing of the network function with the first test suite; and
in response to the result indicating that the network function successfully passed the first test suite, certifying the network function for operation in the network; and
in response to receiving change information indicating that the first test suite has changed to a second test suite:
removing the network function from operation in the network,
communicating retest information to the test automation engine, the retest information corresponding to the second test suite for a retesting of the network function by the test automation engine, and
in response to receiving a second result indicating that the network function successfully passed the second test suite, recertifying the network function for operation in the network.

16. The non-transitory machine-readable medium of claim 15, wherein certifying the network function for operation in the network comprises registering the network function with a network repository function.

17. The non-transitory machine-readable medium of claim 15, wherein certifying the network function for operation in the network comprises adding the network function to a network slice of the wireless network.

18. The non-transitory machine-readable medium of claim 17, wherein the network function is a first network function, and wherein the operations further comprise, notifying a second network function operating in the network slice based on the result indicating that the first network function successfully passed the first test suite.

19. The non-transitory machine-readable medium of claim 17, wherein the operations further comprise, selecting a network slice type-based test suite for the first test suite based on network slice type information.

20. The non-transitory machine-readable medium of claim 15, wherein the operations further comprise, in response to the result indicating that the network function failed the first test suite, outputting failure data correspond to the first test suite of the network function.

* * * * *